Patented Jan. 25, 1944

2,339,853

UNITED STATES PATENT OFFICE 2,339,853

PAVING COMPOSITION

Lucien Hemmer, Notre Dame de Gravenchon, France, assignor, by mesne assignments, to Standard Catalytic Company, a corporation of Delaware No Drawing. Application September 1, 1938, Serial No. 227,888. In France September 15, 1937

1 Claim. (Cl. 106—269)

This invention relates to a method of improving the adhesivity of bitumens to mineral aggregates, metals, such as iron pipes, and other solid surfaces and more particularly to the preparation of improved road paving compositions.

The two methods generally used in the preparation of bituminous pavements are, one in which a layer of bituminous cutback or emulsion is sprayed on a road, a layer of mineral aggregate, such as crushed stone, etc., spread upon it and the mixture compacted; and the other in which mineral aggregate, such as crushed stone, etc., is first provided with a coating of bitumen by mixing the mineral aggregate mechanically with a bitumen or bituminous cutback or emulsion until an adhesive coat of the bitumen is formed on each piece of the mineral aggregate, the coated aggregate then being laid on the road and compacted. Where mineral aggregate is used that has been first dried and hot bitumen or bituminous cutback applied to the mineral aggregate, there is little trouble experienced in securing a good bond of the bitumen and the rocks of the mineral aggregate, except with an acidic aggregate, such as siliceous aggregates. The roads prepared with acidic mineral aggregates, however, often disintegrate under the action of water which tends to displace the bitumen from the surface of the stones.

The present invention relates to a method of improving the adhesivity of bitumen to not only alkaline stones, such as limestone, slag and dolomite, but also and especially to acidic or siliceous type of mineral aggregates, such as quartzite, silex, prophyry, etc., whereby such aggregates can be successfully and permanently coated with bitumen. No heating is necessary during the coating process and the bitumen may be applied either in the form of a cutback or an emulsion. Not only dry, but also wet mineral aggregates are successfully coated by the process of the present invention and the pavings thereby prepared will not disintegrate under the action of water. It will be understood that the invention is especially advantageous in its application to the coating of wet acid mineral aggregates with bituminous cutbacks and emulsions.

Since adhesiveness is a consequence of wetting power, it is important that the wetting power of the bituminous binders toward the mineral aggregate be as high as possible. In the presence of moisture or water, adhesiveness depends upon the respective wetting powers of water and the bituminous binder toward the mineral aggregate: if the wetting power of water is higher than that of the binder, the former will displace the latter and prevent the bituminous binder from sticking to the surface of the stone. This usually occurs with the acidic or siliceous type of mineral aggregates.

It has now been found that the wetting power of bitumens to all types of mineral aggregates may be sufficiently improved for the preparation of water-resistant paving compositions, in the cold, by adding to the bitumen a sufficient amount, at least 5% or more, of a heavy metal soap of a high molecular weight organic acid. The heavy metal soaps used are those soluble in oil and insoluble in water. Soaps of the following metals may be used: lead, iron, zinc, copper, cobalt, manganese, calcium, barium, etc. The organic acids which may be used for the preparation of the soaps are: (a) fatty acids, especially those of the unsaturated series having 7 or more carbon atoms, such as oleic, linoleic, ricinoleic acids, etc.; (b) aromatic and naphthenic acids; (c) sulphonic acids, such as sulfolinoleic acid, sulfonaphthenic acid, the sulphonic acids obtained in the treatment of petroleum products with strong sulfuric acid, etc. Lead or iron oleates and naphthenates are the preferred addition agents that may be added to the bitumen.

The method used for carrying out the invention are described in the following:

The wet mineral aggregate, especially of the siliceous type, is first coated with a liquid bituminous cutback prepared by dissolving asphalt in a light petroleum solvent, such as kerosene, or straight run or cracked naphtha. The bituminous cutback should preferably have a viscosity lower than 25 seconds at 100° C. on the Saybolt Furol Viscosimeter and should not have a higher A. S. T. M. initial boiling point than 100° C. At least 5% of the heavy metal soap, such as lead oleate or naphthenate is added to the bituminous cutback in order to improve its adhesivity to the mineral aggregate. If, however, for any reason, a heavier solvent must be employed, which would naturally evaporate slowly, a filler, such as sand, may be added to the mineral aggregate at the end of the mixing period.

According to a second method, the wet (or dry) mineral aggregate is first precoated with a small amount of a liquid bituminous cutback or any oil having viscosity less than about 25 seconds at 100° C. on the Saybolt Furol Viscosimeter, to which was added a heavy metal soap, such as lead or iron oleate or naphthenate higher than 5% and preferably between 10 and 20%. The mixing is then finished by adding the complementary amount of bitumen in the form of a cutback of higher viscosity which contains no heavy metal soap addition agent. The amount of the bitumen used for precoating may be between 0.5 and 1.5% calculated on the volume of the mineral aggregate and the complementary amount of the cutback may be 4-5% on the volume of the mineral aggregate.

According to a third method, the mineral aggregate is precoated by mixing with 0.5 to 1.5% by volume of cutback or oil containing more than 5% and preferably between 10 and 20% of heavy metal soap. This precoating is carried out in exactly the same way as in the second method. The mixing operation is then finished by adding 6 to 10% of an aqueous asphalt emulsion of commercial type, the bitumen of which may have a penetration of say between 80 and 300 or more.

These three methods can be applied without any heating and allow the making of water-resistant permanent pavements even in rainy weather. Comparative experiments have shown the superiority of the bituminous compositions of the present invention and it has been experimentally demonstarted that pavements prepared according to this invention will stand up under such climatic conditions under which pavements prepared with the same binders but without the addition of the specified amount of heavy metal soap, disintegrate within a comparatively short time.

The invention is not to be limited to the specific embodiments shown or the specific examples given, nor to any theories advanced as to the operation of the invention, but in the appended claims it is intended to claim all inherent novelty in the invention as broadly as the prior art permits.

I claim:

A method of making a paving mixture comprising first precoating a mineral aggregate with a water-free liquid petroleum composition composed of a petroleum oil having a viscosity less than about 25 seconds at 100° C. on the Saybolt Furol Viscosimeter and at least 5% of a metal soap of an organic acid dissolved therein, which soap is soluble in the petroleum oil and then coating with a bituminous material.

LUCIEN HEMMER.